Figure 1:
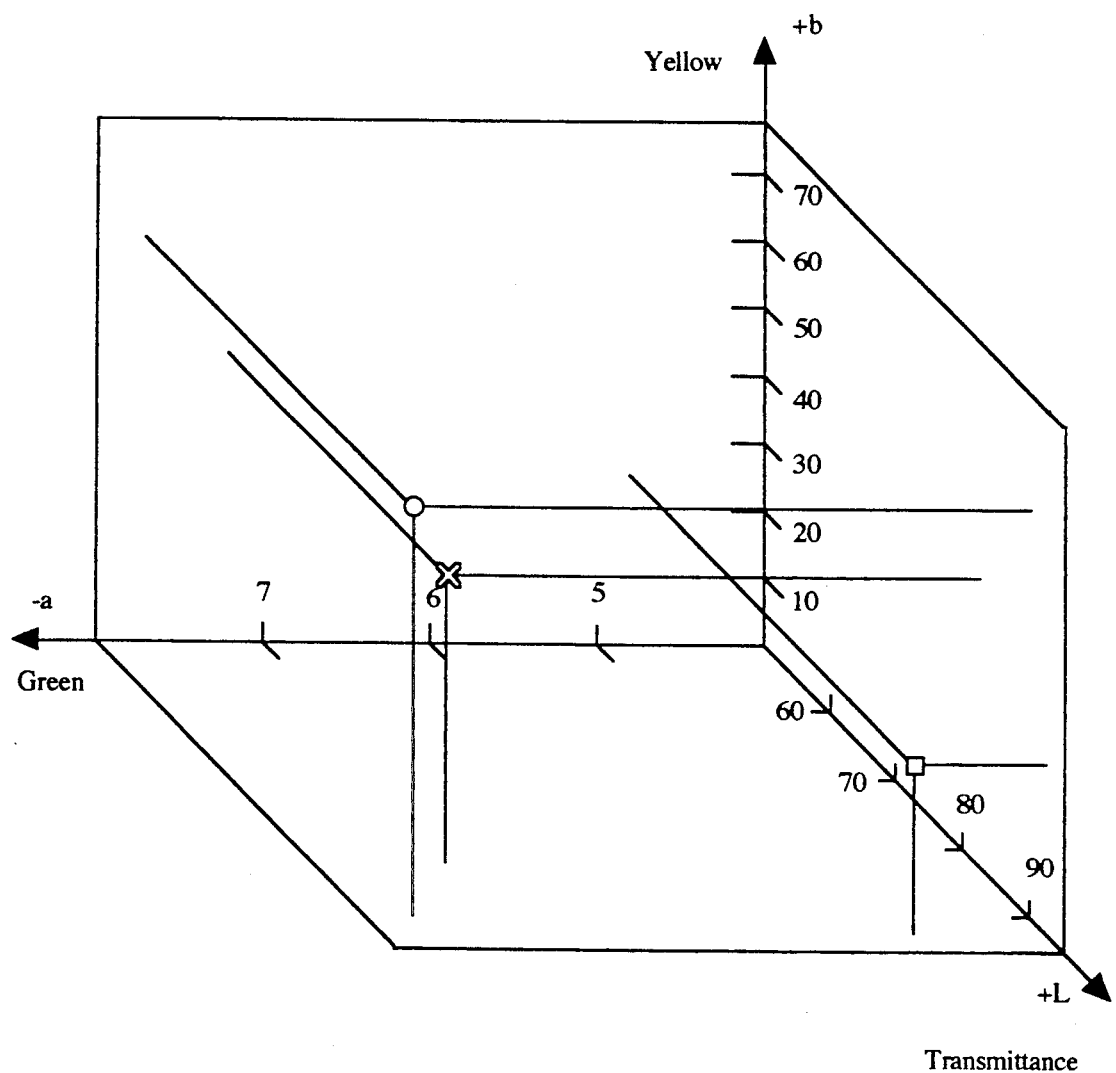

United States Patent [19]

Williams

[11] Patent Number: 5,312,870
[45] Date of Patent: May 17, 1994

[54] METHOD FOR BLEACHING TACKIFYING RESINS

[75] Inventor: Theodore J. Williams, Panama City, Fla.

[73] Assignee: Arizona Chemical Company, Panama City, Fla.

[21] Appl. No.: 66,729

[22] Filed: May 25, 1993

Related U.S. Application Data

[62] Division of Ser. No. 702,253, May 17, 1991.

[51] Int. Cl.$^5$ ............................................... C08F 8/00
[52] U.S. Cl. .................................... 525/193; 525/222; 525/236; 525/237
[58] Field of Search ................ 525/193, 222, 236, 237

[56] References Cited

U.S. PATENT DOCUMENTS

| | | | |
|---|---|---|---|
| 2,518,573 | 8/1950 | Scott | 260/92.3 |
| 2,647,107 | 7/1953 | Barnes | 260/78.5 |
| 3,671,630 | 6/1972 | Carroll et al. | 424/174 |
| 4,107,420 | 8/1978 | Schluenz et al. | 526/237 |
| 4,131,556 | 12/1978 | Klopotek et al. | 252/106 |
| 4,222,954 | 9/1980 | Curcurida et al. | 260/463 |
| 4,482,688 | 11/1984 | Schluenz | 525/356 |
| 4,879,351 | 11/1989 | Schluenz | 525/356 |

*Primary Examiner*—Bernard Lipman
*Attorney, Agent, or Firm*—Luedeka, Neely & Graham

[57] ABSTRACT

A method for bleaching hydrocarbon tackifier resins which comprises adding a bleaching agent to a molten resin and recovering a bleached hydrocarbon tackifier resin. The bleaching agent comprises from about 0.04 wt. % to about 0.06 wt. %, based on the weight of the reaction mixture, of an iodine supplying compound and from about 2.0 wt. % to about 10.0 wt. %, based on the weight of the reaction mixture, of an activating terpene compound. The iodine supplying compound is selected from the group consisting of elemental iodine and hydrogen iodide. The activating compound is selected from the group consisting of α-terpinene, γ-terpinene, d-limonene, 1,4-cyclohexadiene and abietic acid.

3 Claims, 1 Drawing Sheet

METHOD FOR BLEACHING TACKIFYING RESINS

This is a division of Ser. No. 07/702,253, filed May 17, 1991.

The present invention relates to methods for bleaching hydrocarbon tackifier resins.

Tackifier resins are used as additives to elastomers for the formation of, among other things, hot melt adhesives. The color of tackifier resins added to the elastomer, to a large extent, determines the final color of the adhesive. Therefore, it is desirable to produce resins with as little color as possible.

Hydrocarbon tackifier resins prepared by the cationic polymerization of $C_5$ to $C_{10}$ unsaturated hydrocarbon monomers (e.g., terpenes, piperylene, 2-methyl-2-butene, isoprene, styrene, $\alpha$-methylstyrene, and the like) have undesirable dark colors. It is desirable to produce resins having a lower level of color. It is known to use catalytic hydrogenation as a means of decolorizing or bleaching hydrocarbon tackifier resins, but its use is expensive when compared to the use of iodine, which may be used to bleach certain tackifying resins. It is also known that light colored resins prepared from a substantial concentration of terpene monomers may be bleached by treating the monomer feed or the dissolved resin with iodine, chlorine or bromine. See, for example, U.S. Pat. No. 4,482,688 to Schluenz.

However, the use of iodine alone as a bleaching agent is only minimally effective for dark colored polymers prepared from non-terpenic $C_5$ to $C_{10}$ unsaturated hydrocarbon monomers or polymers prepared from mixtures of non-terpenic and terpenic $C_5$ to $C_{10}$ unsaturated hydrocarbon monomers since the process does not reduce the color to a maximum degree. For example, see Schluenz, Supra, Table I, Examples 3i–3l, where a piperylene based polymer is bleached from a color of 3 to a color of 2 and a piperylene/vinyl cyclohexane based copolymer is bleached from a color of 4- to a color of 3. In addition, iodine bleaching tends to produce an undesirable green tint in the bleached resin. Therefore, there is a need for a method of bleaching hydrocarbon resins that is more cost effective than catalytic hydrogenation and more effective than the use of iodine alone.

Accordingly, it is an object of the present invention to provide an efficient and cost effective method for bleaching hydrocarbon tackifying resins of the class described such that they are substantially free of color.

By the present invention, the bleaching of hydrocarbon tackifying resins prepared by the cationic polymerization of $C_5$ to $C_{10}$ unsaturated hydrocarbon monomers of the class described is conveniently conducted by bringing the resin to a molten state and then treating the molten resin with a bleaching agent (comprising an iodine supplying compound and an activating compound) for about an hour while retaining the resin in its molten state. A vacuum is then applied to the resin to remove the reaction product of the activating compound and substantially all of the iodine. The resin is then cooled for use as a tackifier. The resulting resin is substantially lighter in color (by about two to three Gardner numbers) than the starting resin. In addition, there is no undesirable green cast to the bleached resin. An adhesive prepared by compounding a resin bleached according to the present invention with an elastomer has adhesive properties substantially the same as an adhesive prepared with an untreated resin.

Previous processes, such as Schluenz, were effective at bleaching certain resins during polymerization or prior to the removal of the solvent. Attempts to bleach a resin in the molten state were effective only with those resins which were compounded from between 100% and 75% terpene monomers and which were light in color, less than about 3+ on the Gardner scale, prior to bleaching. In contrast, the present invention bleaches resins which are compounded from monomers other than terpenes as well as resins which are copolymers of terpenes and other hydrocarbons (such as, piperylene or styrene). In addition, the bleaching of these darker resins is accomplished conveniently in the molten state of the final resin.

Although the exact mechanism by which the combination of the iodine supplying compound and the activating hydrogen donating compound bleaches the resins is unknown, it is believed that the activating compound should preferably be one that will react with the iodine supplying compound to donate labile (i.e., reactive) hydrogen to the resin. It is postulated that the process can be visualized as a hydrogen exchange or disproportionation between the activating compound and the resin. The reaction products of the activating compound (after resin bleaching) tend to show additional unsaturation which would indicate hydrogen donation to the resin. It is further believed that the iodine supplying compound acts as a catalyst since there is no indication of an increase in halogen content of the resin after bleaching.

One method of carrying out the invention involves bringing the resin to a temperature of between about 150° C. and about 260° C. and preferably between about 200° C. and about 240° C. At this point, between about 2.0 wt % and about 10.0 wt. %, based on the weight of the reaction mixture, of the bleaching agent, comprising an iodine supplying compound and an activating compound, is added to the molten resin. After between about fifteen minutes and an hour, a bleached resin is recovered that is suitable for use as a tackifier in adhesives that are substantially free of unwanted color.

In the practice of the invention, the bleaching agent comprises an iodine supplying compound and an activating hydrogen donating compound, with the activating compound present at a molar concentration from about 25 to about 200 times the molar concentration of the iodine supplying compound. The iodine supplying and activating compounds are added to the molten resin separately or are mixed and added together to the molten resin.

It has been found that a preferred iodine supplying compound is selected from the group consisting of elemental iodine and hydrogen iodide. As pointed out, it is believed that the iodine supplying compound acts as a catalyst during the bleaching of the resin since there is no measurable increase in the halogen content of the resin after bleaching. Both iodine and the spent activating agent are removed together during vacuum stripping.

In general, any of a series of compounds with reactive hydrogens adjacent to one or more double bonds will act as an appropriate activating hydrogen donating compound but $\alpha$-terpinene, $\gamma$-terpinene, d-limonene, 1,4-cyclohexadiene and abietic acid are preferred activating compounds. The reaction products of the activating compounds show a greater amount of unsaturation than is shown in the starting material. For example, when a molten hydrocarbon tackifier resin is treated with iodine and d-limonene (with two sites of unsaturation), the reaction product of the activating compound is the aromatic compound, para-cymene (with three sites of unsaturation). The activating compounds and their reaction products are removed from the resin by vacuum distillation.

Upon removal of the activating species, the bleached resin is cooled and mixed with an appropriate copolymeric elastomer, such as KRATON D-1107 (Shell Chemical Co.) or ELVAX 250 (DuPont) with or without an oil, to produce a formulated adhesive. The adhesive properties of the resulting formulated adhesive are comparable to the properties of an adhesive prepared from an untreated resin, but the color of the adhesive prepared from the treated resin is usually at least two Gardner numbers lighter than the color of an adhesive using an untreated resin.

Thus, the present invention provides an efficient and cost effective method of bleaching hydrocarbon tackifying resins. The bleached resins produce adhesives free of unwanted colors when compounded with suitable elastomers without any decrease in the adhesive properties of the resulting adhesive.

FIG. 1 is a representation of the results of a color analysis of a hydrocarbon resin with a HunterLab tristimulus colorimeter according to Example II. The untreated resin is indicated by a circle, the resin treated with iodine only is indicated by an X, and the resin treated with an iodine supplying species and an activating hydrogen donating species according to the present invention is indicated by a box.

In order to facilitate a further understanding of the invention, the following examples are given for the purposes of illustrating certain more specific details thereof.

EXAMPLE I

A reaction vessel was equipped with a stirrer, a gas inlet, addition funnel and thermometer, and 100 parts mixed aliphatic/aromatic solvent and 3 parts anhydrous aluminum chloride were added to the vessel. While continuously stirring the mixture, 100 parts of a reactive C$_5$ hydrocarbon mixture containing cis and trans-1,3-pentadiene (piperylene), cyclopentene, 2-methyl-2-butene and lesser quantities of C$_4$, C$_5$ and C$_6$ unsaturated hydrocarbons was slowly added over a fifteen minute period. The temperature of the reaction mixture was maintained at 25° C. for 1.5 hours. To the reaction mixture was added 100 parts water to decompose the active polymerization catalyst and quench the reaction. Alternatively, excess ammonia gas is sparged into the reaction mixture until the catalyst is neutralized, as is shown by a loss of color. The organic solution was water washed and filtered to remove the decomposed catalyst and slowly heated to 230° C. to remove unreacted monomer and solvent. A vacuum was applied to remove the residual solvent and the resin was steam stripped to the desired softening point of about 100° C.

The resin was divided into three equal parts. Sample A was left untreated for comparison. Sample B was treated for 1 hour with 0.04 wt. % of an iodine supplying compound, elemental iodine, at 230° C., and then removed from the reactor and cooled. Sample C was treated for 1 hour with 0.04 wt. % of elemental iodine and 4.0 wt. % of an activating hydrogen donating compound, limonene, at 230° C. The resin from C was then vacuum distilled to remove any unreacted limonene and the spent hydrogen donor (reacted limonene). The resin was removed from the reactor and cooled. Table I presents the results for the resins of Samples A, B, and C. The resin treated with both iodine and limonene is fully three Gardner colors lighter than the untreated resin. Also, there is no residual green tint (as seen by Tristimulus Colorimeter Analysis) as a result of the bleaching, as is seen in the resin treated with iodine alone.

TABLE I

| Sample | Final Color | Delta Color* | S.P. | Mn.** | Total Halogen |
|---|---|---|---|---|---|
| A | 5+ | — | 100° C. | 1057 | 1,390 ppm |
| B | 4− (green tint) | 1.5 | 100° C. | — | 1,340 ppm |
| C | 2+ | 3.0 | 97° C. | 965 | 1,310 ppm |

*Untreated Resin Color less Treated Resin Color
**Number Average Molecular Weight by Vapor Phase Osmometry

EXAMPLE II

Color Analysis

Seventy-five percent solids heptane solutions of the resins from Samples A, B, and C of Example I were analyzed with a HunterLab tristimulus colorimeter to further characterize their visible colors. Presented in FIG. 1 is the tristimulus color comparison of the subject resins. The iodine treated resin of B results in a reduction of the yellowness when compared to the untreated resin of A, but no reduction in green tint. This loss of yellow intensifies the observed green tint. The iodine/hydrogen donor treated resin of C results in a further incremental improvement in yellow reduction as well as halving the shade of the green tint, thereby decreasing the observed green color.

EXAMPLE III

Variation in Monomer Feed

A series of C$_5$ hydrocarbon resins were prepared using the polymerization technique described in Example I. A reaction vessel was prepared in accordance with Example I into which was added 100 parts mixed aliphatic/aromatic solvent, 3 parts aluminum chloride and 100 parts of a monomer feed selected from Table II. The monomer feed was added slowly over fifteen minutes at a reaction temperature of 25° C. Upon completion of the addition, the reaction was quenched by the addition of 100 parts of water and the organic layer was separated, water washed, and filtered. The excess solvent was removed under vacuum and the resin was steam stripped to the desired softening point, see Table II.

TABLE II

| Sample Resin | Monomer Feeds (wt. %) | S.P.(°C.) |
|---|---|---|
| D | 90% Piperylene and 10% Styrene | 90 |
| E | 90% Piperylene and 10% α-Methylstyrene | 92 |
| F | Vinyl Toluene | 89 |

The above samples of hydrocarbon resins were heated to a molten state and then treated with 0.04 wt. % iodine and 4.0 wt. % limonene for 1 hour at 230° C. The resin was then vacuum distilled to remove any unreacted limonene as well as spent limonene. The results for the iodine/hydrogen donor treatment are presented in Table III. There is a significant improvement in color of at least 2 points on the Gardner color scale.

TABLE III

| Sample Resin | Gardner Color | | Delta Color* |
|---|---|---|---|
| | Untreated resin | Treated Resin | |
| D | 5 | 2+ | 2.5 |
| E | 5 | 2+ | 2.5 |
| F | 7 | 5 | 2 |

*Color of untreated resin less color of treated resin

EXAMPLE IV

Variation in Monomer Feed

A series of mixed terpene/non-terpene hydrocarbon resins were prepared using the technique of Example III. the monomer feed was selected from table IV.

TABLE IV

| Sample Resin | Monomer Feeds (wt. %) | S.P.(°C.) |
|---|---|---|
| G | 40% Piperylene, 40% Limonene, 20% Styrene | 99 |
| H | 60% Piperylene, 20% Mixed $C_{10}$ Terpenes, 20% Styrene | 88 |

Portions of the resulting hydrocarbon resins were heated to a molten state and then treated with 0.04 wt. % iodine and 4.0 wt. % limonene for 1 hour at 230° C. Other portions of the resins were treated only with 0.04 wt. % iodine in the molten state. The results for each treatment are presented in Table V. There is a significant improvement in color over the starting color as well as over the color after treatment with only iodine.

TABLE V

| Sample Resin | Gardner Color | | | Delta Color* |
|---|---|---|---|---|
| | Untreated | Iodine Treated | Fully Treated | |
| G | 5+ | 4−/3+ | 3− | 2.5 |
| H | 5 | 4−/3+ | 2+ | 2.5 |

*Color of untreated resin less color of fully treated resin.

EXAMPLE V

Variation in Activating Hydrogen Donating Compounds

A sample of molten resin was prepared in the same manner as Sample G of Example IV. The Sample was carefully divided into 3 portions and then each was treated at 230° C. for one hour with various activating hydrogen donating compounds at 100 times molar excess with respect to iodine. The results are shown in Table VI. A sample of molten resin was prepared in the same manner as Sample A of Example I. The resin was carefully divided into 5 portions and then each was treated at 230° C. for one hour with various activating compounds at 100 times molar excess with respect to iodine. The results are shown in Table VII. The results show that a variety of activating compounds are available to bleach hydrocarbon tackifier resins. The use of 1,4-cyclohexadiene improves the color even over the use of limonene. Both compounds show distinct improvements in color and tint with respect to using iodine alone.

TABLE VI

| Activating Compound | Gardner Color | | Delta Color |
|---|---|---|---|
| | Untreated | Treated | |
| Limonene | 5+ | 3 | 2.5 |
| 1,4-cyclohexadiene | 5+ | 3− | 3.0 |
| None (Iodine only) | 5+ | 4−(green tint) | 2.0 |

TABLE VII

| Activating Compound | Gardner Color | | Delta Color |
|---|---|---|---|
| | Untreated | Treated | |
| Limonene | 5+ | 2 | 3.0 |
| α-terpinene | 5+ | 2+ | 3.0 |
| γ-terpinene | 5+ | 2+ | 3.0 |
| Abietic acid | 5+ | 3 | 2.5 |
| None (iodine only) | 5+ | 4− | 1.5–2.0 |

EXAMPLE VI

Hydrogen Exchange Reaction

Samples of molten resin product prepared as in Example I were treated with 0.05 wt. % of iodine and 10.0 wt. % of an activating hydrogen donor for 1 hour at 230° C. The spent activating hydrogen donor was then carefully vacuum distilled from the resin, condensed and collected. The resin was then steam stripped to the desired softening point of 101° C. The collected distillate (which had approximately the same volume as did the hydrogen donor which was added) was then analyzed by GLC for composition (See Table VIII). The distillate shows an increase in the presence of aromatics (indicating an increase in unsaturation) which would be expected if the activating compound was donating hydrogen to the resin. A comparative example was included using the aromatic para-cymene instead of an activating compound. The use of para-cymene with iodine results in no improvement over the use of iodine with no hydrogen donor.

TABLE VIII

| | Before Treatment | After Treatment*** |
|---|---|---|
| Resin Color (Gardner Color, Neat) | 5− | 2+ |
| Hydrogen Donor Source: Limonene | | |
| Dienes* ($C_{10}H_{16}$) | 99% | 70% |
| Aromatics** ($C_{10}H_{14}$) | 0% | 30% |
| Resin Color (Gardner Color, Neat) | 5− | 2+ |
| Hydrogen Donor Source: Alpha-Terpinene | | |
| Dienes* ($C_{10}H_{16}$) | 95% | 50% |
| Aromatics** ($C_{10}H_{14}$) | 0% | 50% |
| Resin Color (Gardner Color, Neat) | 5− | 4 |
| Hydrogen Donor Source: Para-Cymene | | |
| Dienes* ($C_{10}H_{16}$) | 0% | 0% |
| Aromatics** ($C_{10}H_{14}$) | 99% | 99% |

*Predominately dipentene, α-terpinene, γ-terpinene, terpinolene, α-phellandrene, β-phellandrene, isoterpinolene and other methene or menthadienes.
**Para-Cymene
***Treatment involves 0.05 wt. % iodine/10.0 wt. % Hydrogen Donor

EXAMPLE VII

Pressure Sensitive Adhesive (PSA) Formulation

Hydrocarbon resins prepared as in Example I, Samples A and C, were compounded into the pressure sensitive adhesive formulation shown in Tables IX and XI.

KRATON (Shell Chemical Co.) is a styrene/butadiene copolymeric elastomer. The treated resin from Sample C resulted in equivalent tack properties while advantageously starting 2 Gardner color units lighter than the control resin of Sample A. the results of the tests of the tack properties of the adhesives are shown in Tables X and XII. The adhesive properties of the adhesives using the treated resin are substantially the same as those of the adhesives using the untreated resin and the color of the adhesives with the treated resin is substantially better than those compounded with the untreated resin.

TABLE IX

| Component of Adhesive | Parts | % by Weight |
|---|---|---|
| Kraton D-1107 | 100.0 | 19.90 |
| Resin Tackifier | 100.0 | 19.90 |
| Antioxidant | 2.0 | 0.40 |
| Toluene | 300.0 | 59.80 |

TABLE X

| Responses | Units | Untreated | Treated |
|---|---|---|---|
| Initial PSA | Color | 3 | 1 |
| 180° Peel | Ounces/inch | 55 | 60 |
| R. T. Shear | Minutes/1"*1"*2 Kg | 2,880+ | 2,880+ |
| Loop Tack | Ounces/Inch | 70 | 70 |
| S.A.F.T. | °C./Time/1"*1"*1 Kg | 95/10 | 95/10 |
| Rolling Ball | Inches | 10 | 10 |

TABLE XI

| Component of Adhesive | Parts | % by Weight |
|---|---|---|
| Kraton D-1107 | 100 | 18.8 |
| Resin Tackifier | 100 | 18.8 |
| Plastisizing Oil | 30 | 5.6 |
| Antioxidant | 2.0 | 0.4 |
| Toluene | 300 | 56.4 |

TABLE XII

| Responses | Units | Untreated | Treated |
|---|---|---|---|
| Initial PSA | Color | 3 | 1 |
| 180° Peel | Ounces/inch | 40 | 40 |
| R. T. Shear | Min/1"*1" × 2 Kg | 2880+ | 2880+ |
| Loop Tack | Ounces/inch | 55 | 45 |
| S.A.F.T. | °C./Time/1"*1"*1 Kg | 80/7 | 83/3 |
| Rolling Ball | Inches | <5.0 | <5.0 |

| | |
|---|---|
| % Solid in Adhesive: | 40% |
| Adhesive Coating Weight: | 0.583 g/24 in.² |
| Adhesive Coated on: | 2.0 mil mylar film |
| Test Panel: | Polished Aluminum |

EXAMPLE VIII

Hot Melt Adhesive (HMA) Formulation

Hydrocarbon resins prepared as in Example I, Samples A and C, were compounded into hot melt adhesive formulations shown in Table XIII. ELVAX (E. I. duPont de Nemours & Co.) is an ethylene/vinyl acetate copolymeric elastomer. MOBILWAX 145 (Mobil Oil Co.) is a petroleum wax, PARAFLINT H-1 (Moore & Monger) is a polymethylene wax. SHELLWAX 300 is a paraffin wax. Resins prepared as in Sample G of Example IV were also compounded into a hot melt adhesive as is shown in Table XV. The adhesive properties of the adhesives using the treated resins are substantially the same as those of the adhesives using the untreated resins. The final colors of the adhesives with the treated resins are substantially better than the adhesives using the untreated resins. See Tables XIV and XVI.

TABLE XIII

| Component | Parts | % by Weight |
|---|---|---|
| ELVAX 250 | 100 | 20 |
| ELVAX 210 | 100 | 20 |
| Resin Tackifier | 125 | 25 |
| Mobil Wax 145 | 175 | 35 |
| Paraflint H-1 | 25 | 5 |

TABLE XIV

| Response | Units | Untreated | Treated |
|---|---|---|---|
| Initial HMA | Color | 3+ | 2+ |
| Viscosity | cps | 1000 | 1050 |

TABLE XV

| Component | Parts | % by Weight |
|---|---|---|
| ELVAX 250 | 100 | 33.3 |
| SHELLWAX 300 | 100 | 33.3 |
| Resin Tackifier | 100 | 33.3 |

TABLE XVI

| Response | Units | Untreated | Treated |
|---|---|---|---|
| Initial HMA | Color | 4+ | 2+ |

EXAMPLE IX

Neat Resin Color Stability

One hundred grams of samples of hydrocarbon resins as prepared in Samples A and C of Example I were placed in an open container. The container was then placed in a forced air circulating oven at 130° C. The color was recorded initially once the resin became molten and then recorded every 24 hours for four days. See Table XVII. the treated resin showed substantially superior thermal stability when compared to the untreated resin.

TABLE XVII

| | Gardner Color | |
|---|---|---|
| Time (hr.) | Untreated | Treated |
| Initial | 7 | 3+ |
| 24 | 9 | 5− |
| 48 | 11 | 5+ |
| 72 | 12− | 6+ |
| 96 | 13+ | 8.5 |

From the foregoing, it may be seen that the present invention provides a method for the bleaching of dark hydrocarbon adhesive tackifying resins. This method provides an efficient and cost effective means of bleaching where visual appearance is important, i.e., where the adhesive is to be substantially free of color. In addition, there is no detrimental effect on the resin as a tackifier by treatment of the resin according to the present invention.

Various of the features of the invention which are believed to be new are set forth in the appended claims.

What is claimed is:

1. A formulated adhesive comprising:
   a tackifier resin prepared from non-terpenic $C_5$ to $C_{10}$ unsaturated monomers of a mixture of non-terpenic $C_5$ to $C_{10}$ unsaturated hydrocarbon monomers selected from the group consisting of piperylene, 2-methyl-2-butene, isoprene, styrene, and α-methylstyrene, the resin bleached by brining the hydrocarbon resin to a molten state thereby producing a molten resin, adding an iodine supplying compounds selected from the group consisting of elemental iodine and hydrogen iodide to the molten resin, adding an activating hydrogen donating compound selected from the group consisting of α-terpinene, γ-terpinene, d-limonene, 1,4-cyclohexadiene and abietic acid to the molten resin thereby forming a reaction mixture, maintaining the reaction mixture in a molten state for a period of time of between about 15 minutes and about 120 minutes, and removing the activating compound from the reaction mixture thereby recovering a bleached hydrocarbon tackifier resin; and a copolymeric elastomer.

2. A formulated pressure-sensitive adhesive comprising:

a tackifier resin prepared from non-terpenic $C_5$ to $C_{10}$ unsaturated monomers or a mixture of non-terpenic C5 to $C_{10}$ unsaturated hydrocarbon monomers selected from the group consisting of piperylene, 2-methyl-2-butene, isoprene, styrene, and α-methylstyrene, the resin bleached by bringing the hydrocarbon resin to a molten state thereby producing a molten resin, adding an iodine supplying compounds selected from the group consisting of elemental iodine and hydrogen iodide to the molten resin, adding an activating hydrogen donating compound selected from the group consisting of α-terpinene, γ-terpinene, d-limonene, 1,4- cyclohexadiene and abietic acid to the molten resin thereby forming a reaction mixture, maintaining the reaction mixture in a molten state for a period of time of between about 15 minutes and about 120 minutes, and removing the activating compound from the reaction mixture thereby recovering a bleached hydrocarbon tackifier resin; and a styrene/butadiene copolymeric elastomer.

3. A formulated hot melt adhesive comprising:

a tackifier resin prepared from non-terpenic $C_5$ to $C_{10}$ unsaturated monomers or a mixture of non-terpenic C5 to $C_{10}$ unsaturated hydrocarbon monomers selected from the group consisting of piperylene, 2-methyl-2-butene, isoprene, styrene, and α-methylstyrene, the resin bleached by brining the hydrocarbon resin to a molten state thereby producing a molten resin, adding an iodine supplying compounds selected from the group consisting of elemental iodine and hydrogen iodide to the molten resin, adding an activating hydrogen donating compound selected from the group consisting of α-terpinene, γ-terpinene, d-limonene, 1,4-cyclohexadiene and abietic acid to the molten resin thereby forming a reaction mixture, maintaining the reaction mixture in a molten state for a period of time of between about 15 minutes and about 120 minutes, and removing the activating compound from the reaction mixture thereby recovering a bleached hydrocarbon tackifier resin; and an ethylene/vinyl acetate compolymeric elastomer.

* * * * *

UNITED STATES PATENT AND TRADEMARK OFFICE
CERTIFICATE OF CORRECTION

PATENT NO. : 5,312,870
DATED : May 17, 1994
INVENTOR(S) : Theodore J. Williams It is certified that error appears in the above-identified patent and that said Letters Patent is hereby corrected as shown below:

Column 5, line 17, after III. delete "the" and insert
-- The --.

Column 8, line 37, after "XVII." delete "the" and insert
-- The --.

Column 8, Claim 1, line 68, delete "brining" and insert
-- bringing --.

Column 10, Claim 3, line 14, delete "brining" and insert
-- bringing --.

Signed and Sealed this

Sixteenth Day of August, 1994

*Attest:*

BRUCE LEHMAN

*Attesting Officer*  *Commissioner of Patents and Trademarks*